(No Model.)
G. GORTON.
BASKET CLOSURE.
No. 435,823. Patented Sept. 2, 1890.
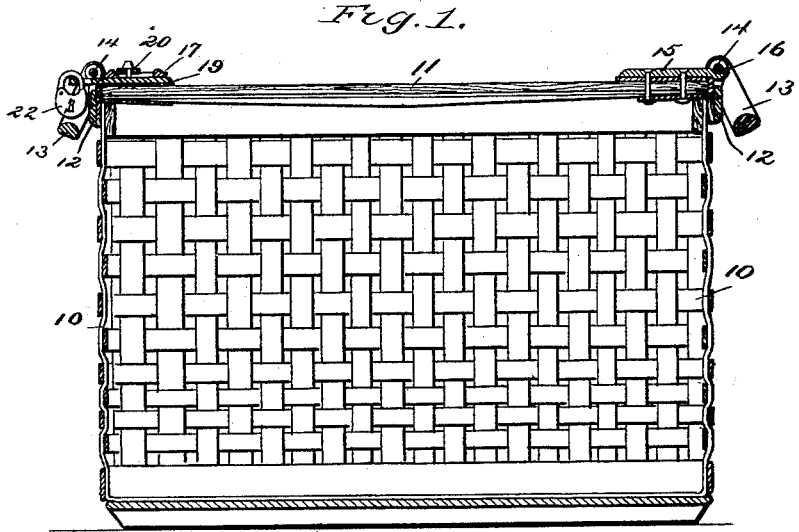
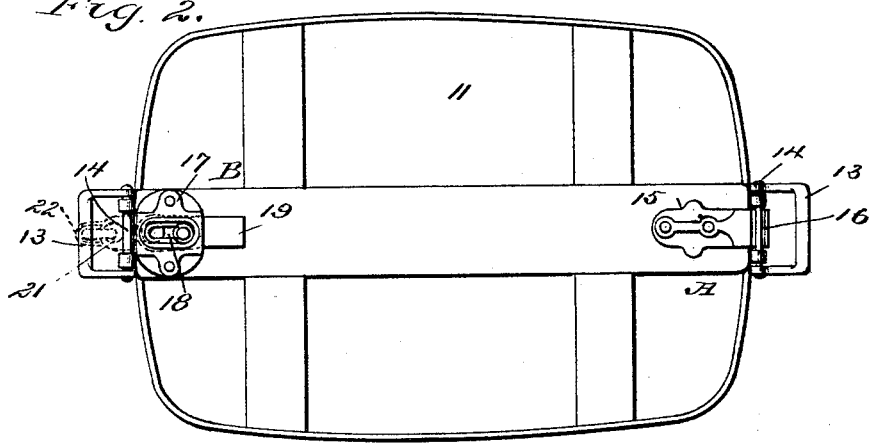
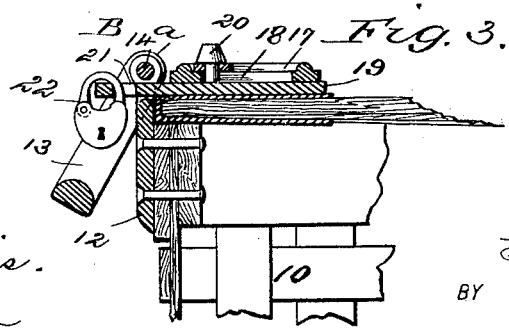
WITNESSES:
N. R. Davis.
C. Sedgwick.
INVENTOR:
G. Gorton
BY Munn & Co.
ATTORNEYS

UNITED STATES PATENT OFFICE.

GEORGE GORTON, OF RACINE, WISCONSIN.

BASKET-CLOSURE.

SPECIFICATION forming part of Letters Patent No. 435,823, dated September 2, 1890.

Application filed May 20, 1890. Serial No. 352,479. (No model.)

*To all whom it may concern:*

Be it known that I, GEORGE GORTON, of Racine, in the county of Racine, and State of Wisconsin, have invented a new and useful Improvement in Baskets, of which the following is a full, clear, and exact description.

My invention relates to an improvement in baskets, hampers, and similar articles having a lid, and has for its object to provide a means whereby the cover or lid may be conveniently and expeditiously removed from or placed in position upon the body of the basket, and also to so construct the hinge, locking device, and handles that the latter will in operation coact with said hinge and locking device and virtually constitute a portion thereof.

Another object of the invention is to provide a means for hinging and locking the cover, which will be exceedingly simple, neat, and durable, and which will not in the least interfere with the packing of the basket when the cover is detached therefrom.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through a basket having the improvements applied thereto. Fig. 2 is a plan view of the basket; and Fig. 3 is an enlarged vertical section through the locking device, illustrating the said device in its locked position.

The body 10 of the basket may be of any suitable or approved construction, and the lid or cover 11 likewise. Preferably, at each end of the body of the basket, at or near the center, a bracket 12 is secured by means of screws, bolts, or equivalent fastening devices, the upper ends of which brackets are bifurcated and extend above and slightly over the top edge of the body of the basket, and likewise above the upper surface of the cover when placed in position upon said body.

To each bracket a handle 13 is pivotally attached, which handles are preferably practically U-shaped, as illustrated in Fig. 2, but may be of any suitable or approved design. The manner of connecting the handles with the basket consists in passing a pintle 14 through the members of the handles and likewise through suitable bores produced in the bifurcated ends of the bracket. In practice the members of the handles are located outside of the side faces of the brackets, as is also best illustrated in Fig. 2. The pintle 14 is loose—that is to say, the said pintle is capable of turning—and made to act somewhat in the capacity of a friction-roller.

To one end of the basket-cover, at the top thereof, one member 15 of a hinge A is secured, which hinge member usually consists of a metal plate the outer end whereof extends beyond the end of the lid or cover and is upturned to form practically a hook 16, as is best shown in Fig. 1; and the complete hinge is formed by passing the hook-like extremity of the section 15, when the cover is in a vertical position, between the bifurcated ends of one of the brackets and beneath the pintle of the said bracket. Thus the pintle connecting the handle to the bracket constitutes the pintle for the hinge A, and when the cover is in a horizontal position or in a position approximating a horizontal line there is no possible danger of the cover becoming detached, although it may be readily removed by being carried upward to approximate a vertical position, and when in this position the section 15 of the hinge may be withdrawn from engagement with the pintle.

The locking device B is located at the opposite end of the cover, and consists of a body-plate 17, which body-plate is provided with a longitudinal recess or opening in its under face, and a shorter elongated slot 18 in its upper face opening into said recess. In the recess a latch-bolt 19 is held to slide, which latch-bolt has attached thereto a pin 20, adapted to project upward through and beyond the slot 18 of the plate, which pin is preferably made to terminate in a knob or its equivalent. The outer end of the latch-bolt 19 has preferably formed therein an aperture 21.

When the lid is in a horizontal position, a lock may be effected by sliding the bolt 19 outward beneath the pintle 14 of the bracket, immediately in front of it, and if the contents of the basket have been packed for transportation or storage a lock 22, preferably of that type known as a "padlock," may be attached to the bolt at its apertured end, as best illustrated in Fig. 3, whereupon the bolt cannot be shot back, as the lock prevents it from passing through the space intervening the opposed faces of the pintle and bracket.

In closing the basket, if the bolt is not quite shot back the pintle 14 acts in the nature of a friction-roller, and tends to carry the bolt back so that the lid may be closed, and as the inner ends of the handles 13 are rounded off, as illustrated at $a$ in Fig. 3, the said ends in contacting with the under surface of the lid act somewhat in the capacity of cams to force the hinged end rearward, thus permitting the lid in closing to fit essentially beneath the bifurcated ends of the brackets, the inner surface of which ends is preferably rounded or given an inward inclination.

Having thus described my invention, I claim as new and desire to secure by Letters Patent—

1. In a basket or similar receptacle, the combination, with brackets attached to the body of the basket and handles pivoted to the brackets, of a hinge-plate attached to the cover of the basket and having one upturned end and a sliding bolt connected with the cover, the bolt and the upturned end of the hinge-plate being adapted to pass between the brackets and their handles, as and for the purpose specified.

2. In a basket or similar receptacle, the combination, with a bracket having a bifurcated upper end, a handle, and a pintle pivoting the said handle to the bifurcated end of the bracket, of a cover, a sliding bolt secured near one edge of the cover, and the said bolt being capable of passing between the members of the bracket beneath the pintle thereof, as and for the purpose specified.

3. In a basket or similar receptacle, the combination, with a bracket, the upper end of which bracket is bifurcated, a handle, and a pintle pivoting the handle to the bracket, of a cover and a hinge-plate secured to one edge of the cover, the outer end of which plate is upturned and adapted to pass between the members of the bracket and beneath the pintle passing through the said bracket, as and for the purpose specified.

GEORGE GORTON.

Witnesses:
CHARLES GORTON,
F. W. GRAHAM.